United States Patent [19]

West, Jr.

[11] Patent Number: 4,531,298

[45] Date of Patent: Jul. 30, 1985

[54] APPARATUS AND METHOD FOR CONTROLLING NORTHERLY TURNING ERROR IN DIRECTION INDICATING NAVIGATIONAL INSTRUMENTS

[75] Inventor: Francis West, Jr., Vineyard Haven, Mass.

[73] Assignee: Robert S. Sanborn, Vineyard Haven, Mass. ; a part interest

[21] Appl. No.: 497,425

[22] Filed: May 24, 1983

[51] Int. Cl.³ .............................................. G01C 17/02
[52] U.S. Cl. ....................................... 33/301; 33/319; 33/356; 33/363 R; 73/178 R
[58] Field of Search ................... 33/356, 319, 322, 352, 33/361, 362, 357, 363 R, 363 K, 363 L, 363 Q, 363 N, 360, 355 R, 316, 317 R, 324, 301; 73/178 R; 244/179

[56] References Cited

U.S. PATENT DOCUMENTS

| | | | |
|---|---|---|---|
| 2,248,748 | 7/1941 | Draper et al. | 33/222 |
| 2,360,330 | 10/1944 | Chance | 33/225 |
| 2,370,000 | 2/1945 | Best | 33/222 |
| 2,400,582 | 5/1946 | West | 33/225 |
| 2,651,842 | 9/1953 | Otto | 33/1 |
| 2,776,807 | 1/1957 | Noxon et al. | 244/179 |
| 2,861,756 | 11/1958 | Feucht et al. | 244/179 |
| 2,893,662 | 7/1959 | Noxon | 244/179 |
| 3,054,581 | 9/1962 | Bornhorst | 33/363 K |
| 3,943,763 | 3/1976 | Garner | 33/356 |
| 4,006,631 | 2/1977 | Garner | 73/178 R |

FOREIGN PATENT DOCUMENTS

| | | | |
|---|---|---|---|
| 538690 | 11/1931 | Fed. Rep. of Germany | 33/319 |
| 125791 | 5/1919 | United Kingdom | 33/319 |

*Primary Examiner*—William D. Martin, Jr.
*Attorney, Agent, or Firm*—Robert S. Sanborn

[57] ABSTRACT

A system to control the effect of northerly turning error which may occur in any direction indicating navigation instrument which includes a component responsive to the earth's magnetic field. In one form, an aircraft magnetic compass is compensated by electric current in an electromagnet which is made responsive to the rate of turn as sensed by a turn and bank indicator. In another form, an aircraft type slaved gyro directional system is protected from the effect of northerly turning error which occurs in its remotely located magnetic azimuth sensor by disconnecting its control circuit from the gyro when the turn rate reaches a predetermined level, thus allowing the gyro to act solely as a directional gyro during the turn. In still another form, the remotely located magnetic azimuth transmitter of a slaved gyro directional system is compensated against northerly turning error occurring in it by electric current in an electromagnet which is made responsive to the rate of turn as sensed by a turn and bank indicator. In some of the forms, the electric current in the electromagnet is made proportional to the rate of turn.

18 Claims, 11 Drawing Figures

APPARATUS AND METHOD FOR CONTROLLING NORTHERLY TURNING ERROR IN DIRECTION INDICATING NAVIGATIONAL INSTRUMENTS

BACKGROUND OF THE INVENTION

This invention relates to the problem of compensating, i.e. eliminating or reducing northerly turning error in navigational instruments such as compasses having elements which are responsive to the earth's magnetic field for use in steering fast moving vehicles such as aircraft.

When an aircraft is making a turn through northerly or southerly courses the magnetic element of its magnetic compass is tilted out of the horizontal plane by centrifugal force. The vertical component of the earth's magnetic field then forces the magnetic element downwardly causing it to turn horizontally during the turn away from the north-south magnetic meridian thus resulting in northerly turning error and an erroneous reading of the aircraft's heading during and at the end of the turn.

Many attempts have been made to solve the problem of northerly turning error. Most of these have involved imposing damping on the compass which is heavy enough to make it very slow in responding to the disturbing force of the vertical component thereby reducing but not eliminating the error. The fault is that the compass is slow in settling down from any disturbance, even though small, with the result that it wanders around the magnetic meridian for a considerable time.

Because of this inherent error in magnetic compasses, aircraft have had to have additional expensive equipment to provide precise turning information.

For many years airplanes have used for this purpose the directional gyro, a delicately balanced instrument whose gyroscopic element tends to remain directionally rigid in space. It is not north-seeking, so it must be manually aligned with the magnetic compass during straight and level flight. Due to friction and imbalances, it will slowly drift away from its setting with the magnetic compass, and must be realigned every fifteen minutes or so. The directional gyro provides precise turning data, which the compass cannot, due to the northerly turning error.

As an improvement, the "slaved gyro" was later developed, whereby a remotely located electronic sensor of the earth's magnetic field was arranged to coerce the gyro into constant alignment with north. Thus the resetting of the directional gyro is done continuously and automatically. This system is now in use on substantially all large aircraft, and is one of the essential components of an aircraft autopilot and of many electronic navigation systems.

But the electronic sensor in the slaved gyro system, sometimes called the "magnetic azimuth transmitter", also has northerly turning error, and at least some of this error creeps into the gyro.

This is because, in order accurately to sense the north-south or horizontal component of the earth's magnetic field, this azimuth transmitter, in the form of a magnetometer assembly, has to be maintained horizontally by a pendulum. During a turn through a northerly or southerly heading, the centrifugal force on the pendulum swings the magnetometer coil out of horizontal so that it responds to the vertical component of the earth's magnetic field with a resulting erroneous response to the horizontal component.

If the sensor could be compensated for the effect of the vertical component, the performance of the slaved gyro system would be improved correspondingly. Or, alternately, if the sensor could be disconnected from the gyro while the aircraft was turning, leaving the gyro to operate solely as a directional gyro, and reconnected after the turn, the turn error in the slaved gyro could be completely nullified by exclusion of the effect of the sensor and its northerly turning error.

The magnetic compass and the magnetic azimuth transmitter may both be described as direction indicating components or elements responsive to the earth's magnetic field, and the problem to be solved is how to eliminate or at least reduce or control by compensation, the inherent northerly turning errors of such components or elements.

It is, accordingly, the broad object of this invention to eliminate or at least reduce northerly turning error in direction indicating devices useful for aircraft and other fast moving vehicles, of the type which includes components or elements responsive to the earth's magnetic field.

More specifically, and in one form of the invention, it is an object to eliminate or at least reduce northerly turning error in magnetic compasses useful in aircraft. In another form of the invention, it is an object to eliminate or at least reduce northerly turning error in slaved gyro systems and other systems which may include sensors of the earth's magnetic field.

SUMMARY OF THE INVENTION

Broadly, the invention covers improvements in direction indicating devices including compasses useful for steering fast moving vehicles such as aircraft and which include means such as a magnetic compass element or a magnetic azimuth transmitter responsive to the earth's magnetic field and in which the improvement includes a turn rate gyro such as is embodied in a turn and bank indicator or turn coordinator proportionately responsive to the rate of turn of the vehicle, means such as an arrangement of magnetically actuated digital switches operated by the turn and bank indicator and thus also responsive, in some cases proportionately, to the rate of turn of the vehicle for producing a signal, preferably electric, and means such as an electromagnet or a relay switch for controlling the northerly turning error occurring in the means responsive to the earth's magnetic field.

The expression "controlling" northerly turning error as variously used herein means eliminating or at least reducing such error by compensation, nullification or exclusion of the effect of the means responsive to the earth's magnetic field.

In one general embodiment, the northerly turning error occurring in an aircraft type magnetic compass is controlled by compensation.

This system includes the magnetic compass and a turn and bank indicator conventionally constructed with an internal gyro arranged to indicate the magnitude of precession of the gyro as proportionate to the rate of turn of the vehicle.

An electric current control switching means, such as an arrangement of magnetically actuated digital switch integrated circuit chips or equivalent current producing and control means is connected to be responsive to the precession of the gyro and thus also to the vehicle's rate of turn, thereby to produce current to energize an electromagnet which is associated in close effective proximity to the magnetic compass. The electromagnet is thus energized to a degree necessary to compensate for the northerly turning error which occurs in the compass during a turn through a northerly or southerly heading. The current imposed on the electromagnet and the position of the electromagnet with respect to the magnetic compass are such that, when the system is properly calibrated, the effect of the energized electromagnet is to eliminate or at least substantially reduce the northerly turning error by compensating or opposing the horizontal effect of the vertical component of the earth's magnetic field on the compass.

In the first alternative of the general embodiment, the switching arrangement is an "on-off" digital system in which the current produced in the electromagnet in response to the turn is a single voltage strength which is adjusted for an average rate of turn.

In the second alternative of this general embodiment the control is a linear output system in which the current produced in the electromagnet in response to the turn is proportionate in strength to the rate of the turn and therefore to the amount of the turning error otherwise produced in the compass.

In another embodiment, the northerly turning error otherwise occurring in the conventional remotely located electronic sensor or magnetic azimuth transmitter of a "slaved gyro" type aircraft directional gyro system is controlled by either exclusion or compensation.

The latter system includes the conventional series of components of such an arrangement. These are a magnetometer assembly maintained normally horizontal by a pendulum, a synchro electrically connected to the magnetometer and whose rotor is mechanically connected to and therefore responsive to the azimuth of the gyro vertical ring, a phase sensitive amplifier responsive to the induced rotor voltage of the synchro proportionately to the amount by which the orientation of the gyro vertical ring and the synchro rotor are out of alignment with the output voltage of the earth's magnetic field sensor, thereby to energize a torque motor connected to the gyro horizontal ring to precess the gyro back into correct north-south orientation.

A normally closed relay switch in the electric line to the torque motor is arranged to be opened to disconnect the torque motor from the magnetic field sensor during a northerly or southerly turn by a signal from the digital switching device which has been added to a turn and bank indicator as above described when the turn reaches a predetermined magnitude as sufficient to produce an undesirable northerly turning error in the sensor which would erroneously affect the orientation of the gyro.

In this disconnected condition, the gyro is no longer a slave but acts as a directional gyro during the turn without any effect from northerly turning error.

Alternatively, the magnetometer may be compensated by the use of an electromagnet placed over or under it in close effective proximity and in which a compensating electric current responsive to the rate of turn is imposed upon it as in the arrangement above described for compensating a magnetic compass.

DETAILED DESCRIPTION OF THE INVENTION

The dip angle is the vertical angle below the horizontal which an unbiased magnetic needle (called a dip needle) theoretically assumes. It is caused by the force resulting from the horizontal and vertical components of the earth's magnetic field, in other words, the actual direction of the force of the field. The dip angle is zero at the magnetic equator because there is no vertical component there, and increases with latitude up to 90 degrees north and south from the magnetic equator because at the poles the direction of the force of the magnetic field is entirely vertical and without any horizontal component. The vertical component is balanced in a magnetic compass by a small weight on the magnetic compass card so that the latter rests normally horizontal or close to it. If the compass card of an aircraft type magnetic compass is tilted in space by centrifugal force as it is during a turn, the vertical component will cause northerly turning error if the turn is through a north or south heading of the aircraft. This can be better understood by reference to the drawings.

Figure 1:
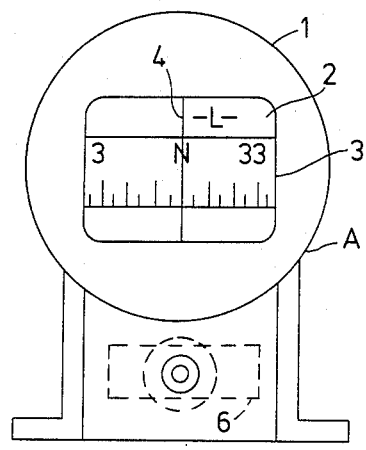
FIG. 1 is a front elevation view of a standard aircraft magnetic compass indicating a northerly heading as viewed by an aircraft pilot, and also the viewer, with an electromagnet added in accordance with the invention.
Figure 3:
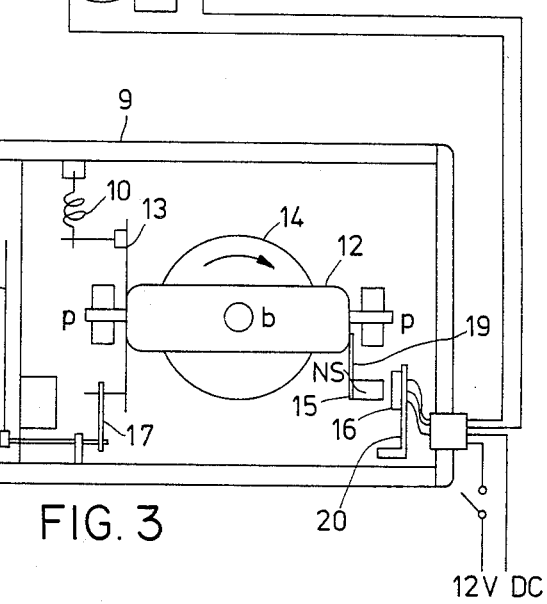
FIG. 3 is a view of the interconnected components comprising the system of the invention including a cut-away side elevation view of the compass and electromagnet of FIG. 1 and a cut-away side elevation of the turn and bank indicator of FIG. 2 showing details of its modification by addition of the digital switching device for use in the system.

As seen in FIGS. 1 and 3, a conventional magnetic compass indicated at A for use in aircraft is constructed in a casing 1 full of damping liguid L with a window 2 through which the pilot sees a compass card 3 with reference to a lubber line 4. Attached to and pendulously below the card 3 are magnets 5 (one being seen in FIG. 3, both seen in FIGS. 5 and 6.) which with the card 3 comprise a magnetic element indicated at E supported on a bearing 3a. The pilot looks edgewise at the compass card 3 rather than downwardly upon it as with the conventional marine compass. Therefore, when heading north, the north indicator N (indicating zero degrees) is toward the pilot while the north-seeking end N of the magnets 5 of the magnetic element are away from the pilot as seen in FIGS. 3, 5 and 6.

Figure 5:
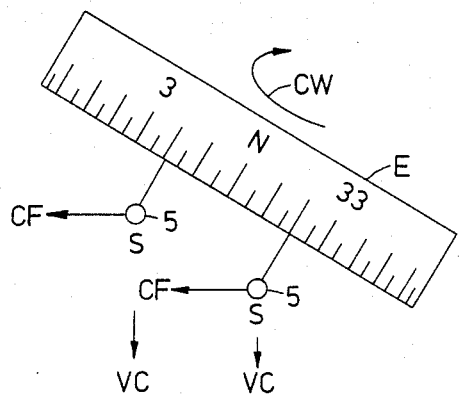
FIG. 5 is a diagram of the magnetic element of the compass of FIG. 1 during a right turn through a northerly heading showing its tilted position in space.
Figure 6:
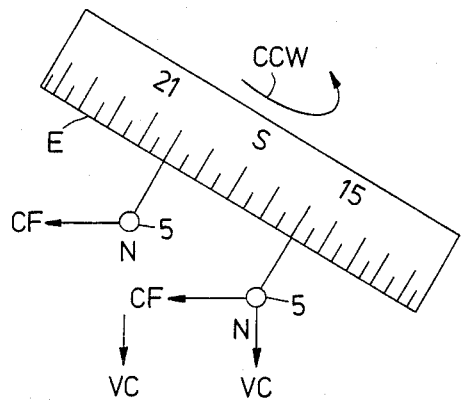
FIG. 6 is a diagram of the magnetic element of the compass of FIG. 1 during a right turn through a southerly heading showing its tilted position in space.

FIG. 5 represents the magnetic element E of the compass on an aircraft making a right turn through north in the northern hemisphere. Centrifugal force CF pulls on the pendulously mounted compass magnets 5 to the left as viewed toward the outside of the turn as indicated by the straight arrows, causing the element to tilt. The north-seeking ends N of the magnets 5 (away from the viewer and not seen in FIG. 5) are pulled down by the vertical component VC as a dip needle would be. This causes a clockwise CW rotation of the magnetic element E as indicated by the circular arrow. But the aircraft itself is also turning clockwise so the compass is slow in indicating the turn. The pilot has to turn the aircraft through a much greater angle than intended in order to obtain the desired reading on the compass card.

Flying south in the northern hemisphere the magnetic element E is 180 degrees from where it was relative to the aircraft while flying north. The north-seeking ends N of the magnets 5 are toward the pilot. When turning right the centrifugal force CF is acting to the left as viewed but on the opposite side on the magnets, as in FIG. 6. The north-seeking ends N of the magnets 5 (toward the viewer) are pulled down as before by the vertical component VC, and this causes a counterclockwise CCW rotation of the element as indicated by the circular arrow. As this rotation is opposite to that of the aircraft which is turning clockwise to the right, the compass responds too fast and too far so that when the desired final heading is indicated on the compass card, the turn is actually much smaller than intended. On a standard turn of 360 degrees in two minutes, the error is in the order of 45 to 50 degrees through north and south and nothing on east and west. After the turn, the compass settles down, but by that time the aircraft is flying on an erroneous track with respect to the ground if the compass has been used as the turn indicator.

In the southern hemisphere, the effects of the northerly and southerly turns are opposite to those north of the equator. That is, the vertical component of the earth's magnetic field pulls the south-seeking ends S of the magnets downwardly, so that in a right turn the compass moves too far too fast and vice versa.

It should be understood that FIGS. 1 and 3 show the compass card 3 in its position relative to the casing 1 during turns, as well as in straight flight. This is because, although the card 3 tilts in space during turns as shown in FIGS. 5 and 6, the entire aircraft, including the compass casing 1 also tilts or banks (in a proper turn) to a degree proportionate to that turn and at an angle pretty much equal to the tilt of the card 3.

As seen in FIGS. 1 and 3, an electromagnetic magnet 6 is mounted in effective close proximity to and under the compass magnetic element E in accordance with the invention, outside the fluid-filled housing 1 and with its axis lying athwartships of (in a direction across) the vehicle in which it is installed. Current in the electromagnet 6 can deflect the compass card 3 in either direction in accordance with the direction of the current flow through the electromagnet 6 in an amount sufficient to compensate for any error up to 50 degrees or more, when the aircraft is making a turn in either direction through northerly or southerly headings. But such a current will have no effect when the aircraft is on an easterly or westerly heading, for reasons to be explained.

As seen in FIG. 3, within the housing 9 of a turn and bank indicator TB is a gyro gimbal ring 12 pivoted at p-p in the fore and aft plane, supporting a turn rate gyro 14 held normally level by a coil spring 10 suspended from the housing and secured to a bracket 13 on the gimbal ring 12. The pointer 11 is actuated by a lever mechanism 17, from the lower end of bracket 13, to show the tilt of the gimbal ring 12 caused by gyroscopic precession during a turn, against the tension of spring 10. The tilt is proportional to the rate of turn of the aircraft.

Figure 4:
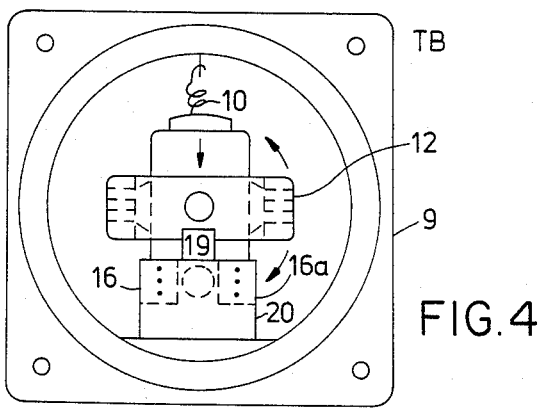
FIG. 4 is a rear elevation view of the turn and bank indicator of FIGS. 2 and 3 also showing details of its modification by addition of the digital switching arrangement for use in the system.

An electric current control switching means operated by the tilt of the gimbal ring is provided to direct current through the electromagnet 6 in one direction or the other during turns right or left. As seen in FIGS. 3 and 4 this consists of two solid state "Hall Effect" magnetically actuated digital switch integrated circuit chips 16 and 16a on a bracket 20 secured to the housing 9 and an Alnico magnet 15 mounted on bracket 19 on the gimbal ring 12 so as to move with it. Such chips and their elements and operation are well known. Suffice it to say here that close proximity of the magnet 15 to either chip 16 or 16a causes the chip to act as a switch to close an electric circuit as further described.

In straight flight the magnet 15 is equidistant between the switches 16 and 16a. In this position there is insufficient magnetic flux density to actuate either switch, so both are off. When the aircraft starts to turn, the tilt of the gyro gimbal ring 12 will rotate the bracket 19 swinging the magnet 15 close to one of the switches 16 or 16a, thus to close it, i.e. turn it on. The opposite switch will remain off. The switch will remain on as long as the aircraft is turning, and will energize the electromagnet 6 in a direction of current flow to oppose the turning error. During a turn in the other direction, through the same heading, the tilt of the gyro in the opposite direction will reverse the operation of the switches 16 and 16a, causing current to flow in the electromagnet 6 to compensate the northerly turning error in that direction. The current is adjusted for optimum compensation by a variable resistor 8. Faster turns will somewhat under compensate the error, but this can be anticipated by the pilot. The adjustment of the control 8 can be made by flying the aircraft repeatedly through a known geographical course change until the compass indicates the proper turn angle as observed by distant objects. This adjustment will be permament unless the aircraft encounters large changes in latitude, in which case readjustment can be made. In south latitudes the polarity of the electromagnet must be reversed because of the opposite effect of left and right turns thru northerly and southerly headings.

A milliammeter M in the control circuit monitors the performance of the system by displaying the current flowing in the electromagnet 6.

Figure 9:
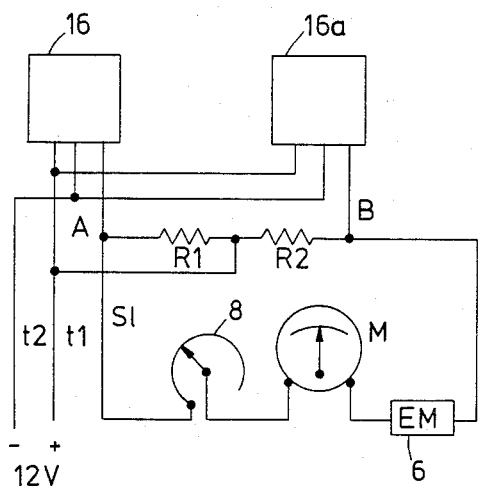
FIG. 9 is a circuit diagram showing the electical operation of the switching control in the embodiment shown in FIGS. 1 through 4.

The circuit diagram in FIG. 9 illustrates the interconnection and operation of the electrical components described above and shown in FIGS. 3 and 4 and is more readily followed than the circuit indicated in FIG. 3.

When the magnet 15 swings into close proximity to the switch 16a the latter will close as above described, allowing current to flow from terminal t1 carrying 12 volt plus current through the resistor R2, the switch 16a, and back to the terminal t2 at 12 volt minus or ground potential. The voltage drop across the resistor R2 will also cause current to flow through the resistors R1 and R2, from point A to point B because there is a 12 volt potential at point A from the terminal t1 back through the resistor R1 with no voltage drop because the switch 16 is open. A portion of the current flow from the terminal t1 will also flow through a shunt line s1 from point A through the variable resistor 8, the milliammeter M, and the electromagnet 6 (as seen, from left to right) and thence to point B and through the switch 16a to the ground terminal t2.

When the switch 16a is open, and the switch 16 closes by movement of the magnet 15 into proximity with it, the voltage drop will occur across the resistor R1 so the current will flow from point B to point A in the line through the resistors R2 and R1. Hence the current flow through the shunt s1 including the electromagnet 6, the milliammeter M and the variable resistor 8 will be in the opposite direction from that first described, i.e. from right to left.

Since the compensating arrangement according to the invention thus far described and shown primarily in FIGS. 3 and 4 is based on an "on-off" system in which the compensating current into the electromagnet 6 is adjusted for an average turn, some practical applications may call for a somewhat more sophisticated system in which the current and therefore the compensating effect is proportional to the rate of turn and therefore the error caused by the turn.

Figure 10:
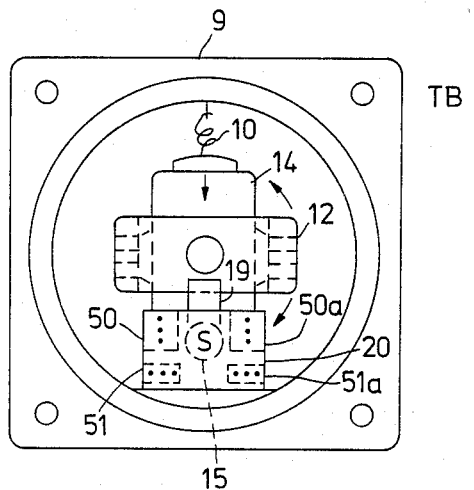
FIG. 10 is a rear elevation view of a turn and bank indicator similar to FIG. 4 which includes two linear output integrated circuit chips and two transistor amplifiers to provide proportional response in an alternative embodiment of the system shown in FIGS. 1 through 4.
Figure 11:
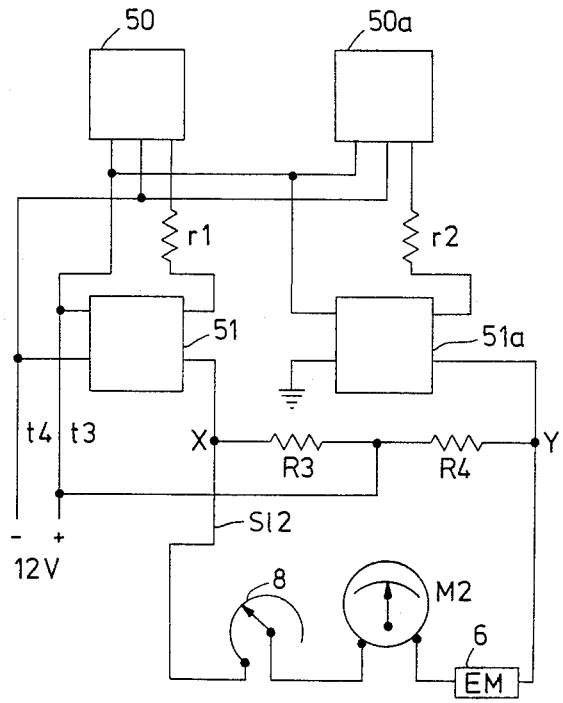
FIG. 11 is a circuit diagram showing the electical operation of the proportional control in the embodiment shown in FIG. 10.

Such a system is shown in FIGS. 10 and 11. In place of the digital switch chips 16 and 16a of FIGS. 3, 4, and 9, a pair of solid state "Hall Effect" magnetically actuated linear output integrated circuit chips 50 and 50a are mounted on a bracket 20a secured to the housing 9 of the turn and bank indicator TB of FIGS. 2, 3, and 4 as shown in FIG. 10. The characteristic of such a chip is that of a sensor whose current output increases proportionately as a permanent magnet approaches in close proximity to it. Thus when the magnet 15 is centered between and equidistant from the sensors 50 and 50a during straight flight with no tilt of the gimbal ring 12 on which it is mounted, the current outputs of said sensors are minimal and equal, and in effect they cancel each other out. As the magnet 15 approaches one or the other during a turn, the current output of one increases, and decreases in the otner.

But, since the maximum current output of such sensor chips 50 and 50a is inherently relatively low, the use of well known transistor amplifiers 51 and 51a also mounted on the bracket 20a is necessary to boost their current outputs. A circuit diagram for this arrangement is shown in FIG. 11. As the magnet 15 swings closer to the chip 50a the latter's output will increase and that of the chip 50 will decrease. Current will increasingly flow from a terminal t3 carrying a 12 volt plus current to the amplifier 51a, thence through the resistor r2, the chip 50a, and back to ground potential at the terminal t4. This will cause an increase in the flow through the resistor R4, and hence an increase in the voltage drop across it. Hence the 12 volt potential at point X will be increasingly higher than that at point Y, and current will also flow from point X by way of the shunt line s12 through the variable resistor 18, the milliammeter M2 and electromagnet 6 to Y. When the magnet 15 swings closer to the chip 50, the potential at point Y will be higher than that at point X because of the increasing voltage drop across the resistor R3 and hence the current through the variable resistor 18, the milliammeter M2 and the electromagnet 6 will be reversed from that described above. The variable resistor 8 will be adjusted for optimum compensation for an average or standard rate of turn, and because the current is proportional to the turn rate, the adjustment will be approximately correct for slower or faster turns.

As above stated, the effect of the electromagnet 6 reduces from maximum on turns through northerly and southerly headings to zero when the aircraft is turning through easterly and westerly courses in both north and south latitudes because its axis becomes parallel to the compass magnets. At the same time the northerly turning error also correspondingly reduces to zero during turns through easterly and westerly headings as the magnet element is being tilted around its east-west axis. In this case, the compass magnets are dipping in the same vertical plane as the vertical component of the earth's magnetic field so the latter cannot cause compass error.

Figure 8:
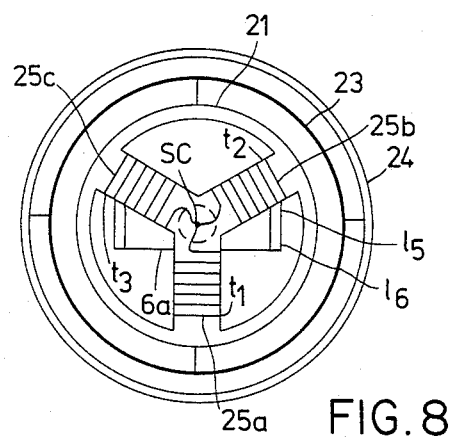
FIG. 8 is a schematic plan view of the magnetometer arrangement of a slaved gyro system with a compensating electromagnet arranged under it in accordance with the invention as also seen in FIG. 7.
Figure 7:
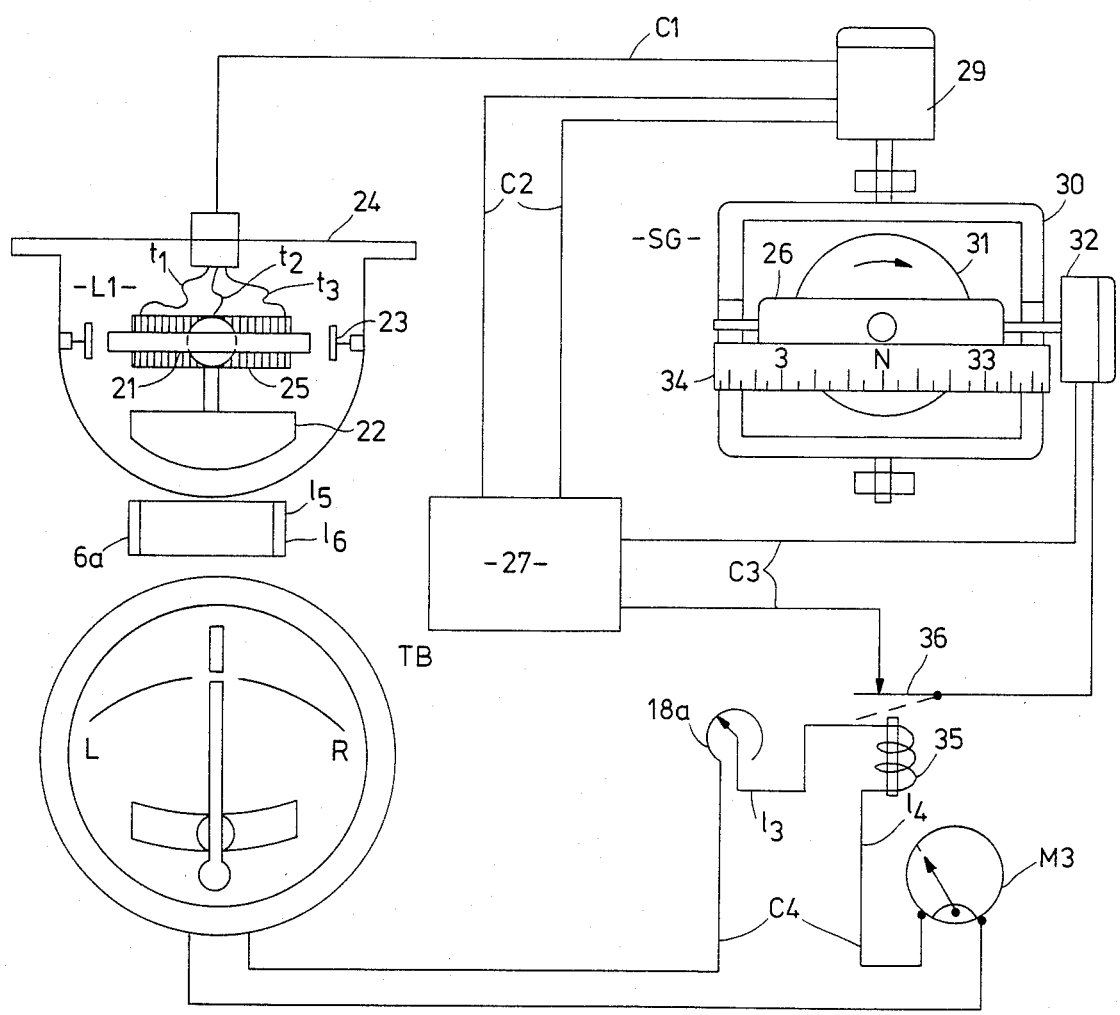
FIG. 7 is a general view of a slaved gyro system of the invention with means to disconnect the slaving control during turns.

A conventional slaved gyro system indicated at SG with compensation for northerly turning error added in accordance with this invention is shown in FIG. 7, with detail also seen in FIG. 8. It includes means to disconnect the slaving control during turns thereby to nullify its erroneous effect because of northerly turning error and to reconnect it after the turn. Thus on straight courses the slaving system is in effect to keep the gyro orientated magnetic north-south so that the pilot does not have to keep setting it as with an ordinary directional gyro for use during a turn. But during turns, the slave control is disconnected so that the instrument acts as an accurate directional gyro instrument which does not reflect northerly turning error occurring in the slave control system.

A magnetic azimuth transmitter comprised of three saturable inductor legs in the form of coils 25a, 25b and 25c spaced 120 degrees apart in a magnetometer assembly 21. The assembly 21 is held normally horizontal by a pendulum 22 and is supported by a gimbal ring 23, all enclosed in a housing 24 filled by damping fluid L1 to dampen the pendulum. The magnetometer assembly 21 has a center primary winding (not shown) for excitation and three secondary windings 25a, 25b and 25c are star connected at sc and have flexible output leads t1, t2 and t3 as seen in FIG. 8. which are connected as seen in FIG. 7, by a circuit C1 to the stator windings (not shown) of a conventional synchro 29. In operation the saturable inductor leg 25a, 25b or 25c which is more closely aligned with the northsouth magnetic meridian will have a greater output than the other two legs in varying amounts will have lesser outputs. The stator windings of the synchro 29 will exhibit the same voltage differences as the inductors 25a, 25b and 25c to which they are connected. During a turn the magnetometer 21 will be tilted out of the horizontal by centrifugal force, causing a northerly turning error on a turn through north or south. The rotor (not shown) of the synchro 29 is mechanically connected to the gyro vertical ring 30 of the slave gyro indicated at SG and its induced output voltage will be minimum when the ring 30 and gyro 31 are in the same north-south orientation as that sensed by the magnotometer 21, but will increase when these orientations become different. This rotor output voltage through a circuit C2 is amplified by a phase sensitive amplifier 27, whose output is then impressed through a circuit C3 on a "torquer" motor 32. The motor 32 is mechanically coupled to the gyro gimbal ring 26 so that its torque will precess the gyro 31 through its gimbal ring 26 causing the vertical ring 30 and attached magnetic azimuth indicating dial 34 to turn in azimuth as required to agree with the magnetometer output differentials and hence with magnetic northsouth orientation. Well known means, not shown, are arranged for maintaining the gimbal ring 26 horizontal. When the gyro drifts away from this agreement, the torquer motor 32 thus precesses the gyro SG back to north.

Figure 2:
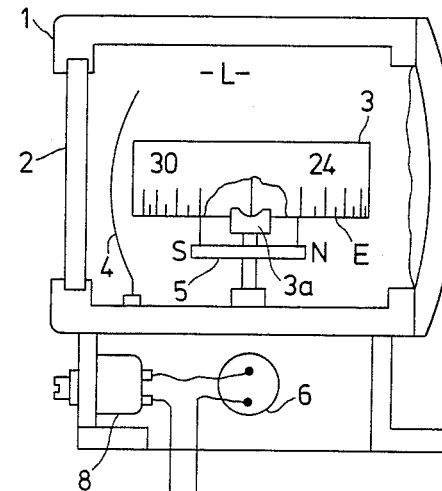
FIG. 2 is a front elevation view of a turn and bank indicator as viewed by an aircraft pilot, and used in the system of the invention.
Figure 2:
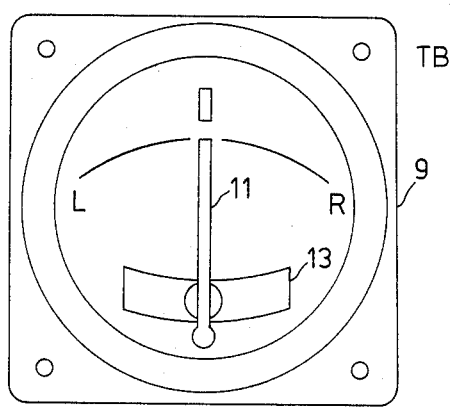

In accordance with the invention, the means for eliminating the northerly turning error by excluding it from the gyro system include a turn and bank indicator indicated at TB identical to that shown in FIGS. 2, 3 and 4 and which contains the additions in accordance with the invention. During a turn it produces a current through circuit C4 to a normally closed relay switch 35 causing its contact 36 to open to the dotted line position as shown. This disconnects the torquer motor 32 from the amplifier 27 and thus nullifies the effect of the circuit C1 from the magnetometer assembly 21.

The gyro SG will no longer be "enslaved" but will operate as a directional gyro through the turn and for as long as the relay switch 35 remains open, completely insulated from the northerly turning error felt by the magnetometer 21. After the turn, the relay switch 35 is allowed to close to reestablish slaving control of the gyro SG by one magnetometer 21.

A milliammeter M3 may be included in the circuit C4 to act as a safety device. It will show when the circuit C4 is normally deenergized to leave the switch 35 closed so that the slave system is working to keep the gyro SG on north during straight flight. A variable resistor 18a, the same as the controls 8 and 18 may also be included in the circuit C4 for a purpose to be described.

An alternate arrangement for eliminating northerly turning error from the slaved gyro system is, as seen in FIG. 8 to place an electromagnet 6a, having leads 15 and 16, with its axis lying athwartships of the vehicle in which it is installed, and close under or over magnitometer 21 and in effective proximity to it. The relay switch 35 is eliminated from the circuit C4. Instead the circuit C4 is connected at the points 13 and 14 to the leads 15 and 16 into the electromagnet 6a. The turn and bank indicator TB containing the digital switch control of the invention as above described will thus impose a compensating current in the electromagnet 6a to correct northerly turning error occurring in the magnetometer 21 in the same manner as that affected by the system above described and shown in FIGS. 1 through 4.

Likewise, the linear output control system above described and shown in FIGS. 10 and 11 may be substituted as an alternative if current proportional to the turn rate is desired in the electromagnet.

In place of the particular current producing means responsive to the rate of turn gyroscope in the various embodiments as described above, other control and switching devices having and producing the same essential function and result may be substituted, such as a photo-electric system. The term "current producing means" is intended to cover any such known means. In place of the turn and bank indicator TB, a conventional turn coordinator may be substituted with its turn rate gyro modified in the same manner to produce the same results in accordance with the invention.

It will be understood that the northerly turning error occurring in the magnetometer 21 is not ordinarily reproduced to a full extent in the slave gyro SG even without exclusion or compensation because the corrective precession occurring in the slave gyro is slow to respond, not only to corrections but also to errors. But any such reproduced error is undesirable and is best eliminated by one of the arrangements described herein.

Thus, in any form of navigational instrument which includes a component or element subject to northerly turning error, such an error may be controlled either by compensation or exclusion and nullification of its effect on the system in accordance with the invention.

What is claimed is:

1. A navigational direction indicating device, useful for steering fast moving vehicles, of the type which includes means responsive to the earth's magnetic field, wherein the improvement comprises a rate of turn gyroscope, electric current producing means responsive to said rate of turn gyroscope and means responsive to said electric current producing means operable to control northerly turning error occurring in the said earth's magnetic field responsive means.

2. A device according to claim 1 in which the rate of turn gyroscope is embodied in a turn and bank indicator.

3. A device according to claim 1 in which the current producing means includes an arrangement of magnetically actuated integrated circuit chips.

4. A device according to claim 3 in which the said chips are digital switches.

5. A device according to claim 3 in which the said chips are linear out put magnetic sensors.

6. A device according to claim 3 which includes a turn and bank indicator and in which the current producing means is operated by said turn and bank indicator.

7. A device according to claim 1 which includes means to adjust the effective strength of the current produced by said current producing means.

8. A device according to claim 1 in which the means responsive to the earth's magnetic field is the magnetic element of a magnetic compass.

9. A device according to claim 8 in which the means responsive to said current producing means is an electromagnet in effective proximity to the said magnetic element.

10. A device according to claim 1 in which the means responsive to the earth's magnetic field is a magnetometer assembly.

11. A device according to claim 10 in which the magnetometer assembly is connected to control the magnetic orientation of a slaved gyro.

12. A device according to claim 11 in which the means responsive to the current producing means is operable to disconnect the magnetometer assembly from the slaved gyro control means thereby to exclude the control effect of the magnetometer assembly on the slaved gyro when northerly turning error is produced by the magnetometer assembly during a turn.

13. A device according to claim 10 in which means responsive to said current producing means is an electromagnet in effective proximity to the magnetometer assembly.

14. A device according to claim 13 in which said current producing means is operative to generate a current in said electromagnet in response to a precession of said gyro during a turn and which is effective substantially to compensate said magnetometer for a northerly turning error produced by a said turn.

15. Apparatus for compensating northerly turning error in a magnetic compass in a vehicle comprising a rate of turn gyro, means to generate an electric current responsive to the precession of said gyro during a turn of said vehicle, an electromagnet for athwartships mounting in effective proximity to the compass and means to impose a said responsive current on said electromagnet effective to compensate a said error in said compass.

16. Apparatus for compensating northerly turning error in a slaved directional gyro system in a vehicle, said apparatus including a magnetic azimuth transmitter, a said slaved directional gyro, a rate of turn gyro; means to generate a current responsive to the precession of said rate of turn gyro during a turn of said vehicle and means responsive to a said current to control the effect of the said magnetic azimuth transmitter during turns which are at a rate sufficienty high to produce undesireable northerly turning error in the magnetic azimuth transmitter.

17. Method of controlling northerly turning error in a navigational direction indicating device of the type having an element responsive to the earth's magnetic field which includes the steps of measuring the rate of turn of a vehicle with a rate of turn gyro, generating a current in response to the precession of said rate of turn gyro and, in response to said current, controlling the effect of northerly turning error occurring in said element responsive to the earth's magnetic field.

18. Method of controlling northerly turning error in a magnetic compass which includes the steps of measuring with a rate of turn gyro the rate of turn of the vehicle in which the compass is installed, placing an electromagnet in effective proximity to the magnetic element of said compass, generating a current in response to the precession of said rate of turn gyro and imposing said current on said electromagnet to compensate northerly turning error occurring during a turn.

* * * * *